United States Patent [19]

Fortescue

[11] 4,357,606

[45] Nov. 2, 1982

[54] MULTI-STATION TELEMETRY SYSTEM USING FIBRE OPTICS CABLES

[75] Inventor: Michael Fortescue, Stanstead Mountfitchett, England

[73] Assignee: A. C. Cossor Limited, Harlow, England

[21] Appl. No.: 176,925

[22] Filed: Aug. 11, 1980

[30] Foreign Application Priority Data

Aug. 16, 1979 [GB] United Kingdom ............... 7928609

[51] Int. Cl.³ ..................... G08C 19/00; H04Q 9/00
[52] U.S. Cl. ..................... 340/870.01; 350/96.16; 370/1; 340/870.29
[58] Field of Search ............ 340/151, 870.29, 870.01; 350/96.16; 370/1

[56] References Cited

U.S. PATENT DOCUMENTS

| 4,117,460 | 9/1978 | Walworth | 340/870.29 |
| 4,124,839 | 1/1978 | Cohen | 340/151 |
| 4,166,946 | 9/1979 | Chown | 350/96.16 |

FOREIGN PATENT DOCUMENTS

| 1221974 | 2/1971 | United Kingdom. |
| 1317386 | 5/1973 | United Kingdom. |
| 1493138 | 11/1977 | United Kingdom. |
| 1504792 | 3/1978 | United Kingdom. |
| 1534786 | 12/1978 | United Kingdom. |

Primary Examiner—Harold I. Pitts
Attorney, Agent, or Firm—Robert F. O'Connell

[57] ABSTRACT

The system interfaces with a conventional data bus 10 and address bus 12. A decoded address pulses one address line 17 and a corresponding transducer 20 launches light pulses on all sixteen fibres of a cable 21. All cables 21 lead to corresponding transducer stations from which return cables 22 with sixteen fibres return to the central station. The return cable fibres interface with transducers 23 which correspond to bits rather than transducer stations. Data from the transducer stations is therefore multiplexed on to a sixteen data bus 10. At each transducer station, the ends of the sixteen fibres 21 face the ends of the sixteen fibres 22 across a gap in which an encoding disc rotates. Clear and opaque areas around tracks on the disc provide encoding by allowing light pulses to return on selected fibres 22 in codes corresponding to angular positions of the disc. The codes are preferably Gray codes and exclusive OR gates 25 may then be employed to transcode to binary on the bus 10.

The invention is especially useful in hazardous environments and can eliminate the use of some explosion-proof enclosures and ducted cabling in gas, oil and chemical plants utilizing telemetry for process control.

7 Claims, 6 Drawing Figures

MULTI-STATION TELEMETRY SYSTEM USING FIBRE OPTICS CABLES

INTRODUCTION

The present invention relates to a telemetry system comprising a plurality of transducer stations and a central station. The invention concerns the form of the complete system and the central station may incorporate a microprocessor in a process control system of which the telemetry system is a part or may be a data logger or a data terminal transmitting data to a remote location. (The latter possibility is selected for the embodiment of the invention described later on purely by way of example).

BACKGROUND OF THE INVENTION

The invention is particularly valuable in hazardous environments although it is not restricted to such use. Important users of telemetry include the Gas, Oil, Chemical and Petrochemical industries, all of which are required to meet high standards of safety and to work within stringent safety regulations.

Thus, it is a well known problem to effect remote monitoring of pressures and flows of flammable fluids without the introduction of electrical or mechanical energy of magnitude sufficient to produce a spark. There are several conventional methods of overcoming this problem, of which the two most commonly used are as follows:

(1) Instrumentation contained in explosion-proof cases.

(2) Intrinsically safe barrier circuits.

The explosion proof case is designed to contain any source of ignition and an explosion without affecting the surrounding atmosphere. The complete instrument, including the case, must be approved for use in hazardous areas by the appropriate national authority and typically has to display a reference to the certificate of approval. Such instruments are very expensive.

The intrinsically safe barrier circuit is designed to limit the electrical power to a level below that required to produce a spark. Barrier circuits must be approved by the approving authority for use in a safe area with a continuous cable, having no in-line connectors, to the instrument located in the hazardous area. Approved barrier circuits are encapsulated and contain inaccessible fuses rated at 50 mA maximum, thus an open-circuit fuse necessitates replacement of the barrier circuit. Also, the internal resistance of these barrier circuits prohibits the use of certain instruments.

The instrument associated with the barrier circuit must not possess any form of electrical energy storage of magnitude greater than the safety limit and must be approved by the authority for use in a hazardous area in conjunction with an approved intrinisically safe barrier circuit. The instrument case must not consist of any materials which would produce a spark when brought into contact with other solid materials; e.g. the dropping of tools on to the case. Other problems encountered with this type of installation include the provision of a mains isolating transformer and a separate station earth to which the barrier circuits must be connected.

The object of the present invention is to provide a system which is inherently safer than known systems, leads to substantial cost savings and can remove many of the limitations imposed by known systems.

BRIEF SUMMARY OF THE INVENTION

According to the invention there is provided a telemetry system comprising a plurality of transducer stations connected to a central station by respective fibre optics cables, each comprising at least one first fibre and a plurality of second fibres, each transducer station including selective light transfer means responsive to the transduced quality to cause light to pass from said at least one first fibre to a combination of the second fibres corresponding to the transduced quantity, the central station comprising launching means adapted to launch light pulses in said at least one first fibre of any one selected cable, and means responsive to light pulses returning along the second fibres to multiplex data pertaining to the various transducer stations.

There are various ways in which the first fibres can be selected consistent with knowing from which transducer station data is to be obtained. The preferred way (which is consistent with current instrumentation technology) is to address the transducer stations individually and to launch pulses on all first fibres of the addressed station. All data from that station returns in bit-parallel form and the data bus can have a corresponding bit format. Although a transducer station can provide a multibit word digitizing the transduced variable, some transducer stations can be very simple, providing a one-bit result from say a pressure switch controlling an obdurating vane between the ends of one first fibre and the corresponding second fibre.

For the multibit data, the obturating means can be an encoding disc with tracks of clear and opaque areas, each track corresponding to one first fibre and the corresponding second fibre. The encoding of the tracks can be binary or a Gray code of which the latter maintains the required resolution, with a reduction in the number of transitions in the least significant track. A novel modification of the Gray code is described below, which further reduces the number of transitions. The Gray code can be transcoded to binary, if required, at the central station.

The data bus can be an electrical bus, e.g. of a microprocessor, data logger or transmitting terminal. In the latter case the bus could be a fibre optics cable.

A system according to the invention can eliminate much expensive hardware and structure including explosion-proof enclosures, barrier circuits and ducted cabling. For telemintry purposes alone, a single explosion-proof enclosure at the master station will suffice. The only connection to the transducer stations is by way of the safe fibre optics cable. For process control, explosion-proof enclosures will be required for some actuators to which electrical control signals are sent but there will still be considerable savings on the data acquisition side of the system.

In addition to the safety features and the savings in equipment and associated labour, the proposed instrumentation offers the following advantages:

(1) Analogue to digital conversion is not required as the value originates in digital form at the transducer station.

(2) The inherent system accuracy is that of the actual transducing device (e.g. a Bourdon tube) at a transducer station.

(3) The selling price of the transducing device should be below that of conventional instruments.

(4) The same device will operate over a wide range of pressures, thus simplifying purchase, installation, spares holding, replacement and source pressure alteration.

(5) The device obviates the need for the separate gauge normally fitted at the point of measurement.

(6) The overall reduction in installation cost will extend the available market into areas where telemetry and process control systems have not been considered previously on grounds of cost.

(7) In certain circumstances the use of the system could result in lower insurance premiums for the customer.

BRIEF DESCRIPTION OF THE DRAWINGS

A system embodying the invention will now be described in some detail, by way of example, with reference to the accompanying drawings, in which.

DESCRIPTION OF THE PREFERRED EMBODIMENT

Figure 1:
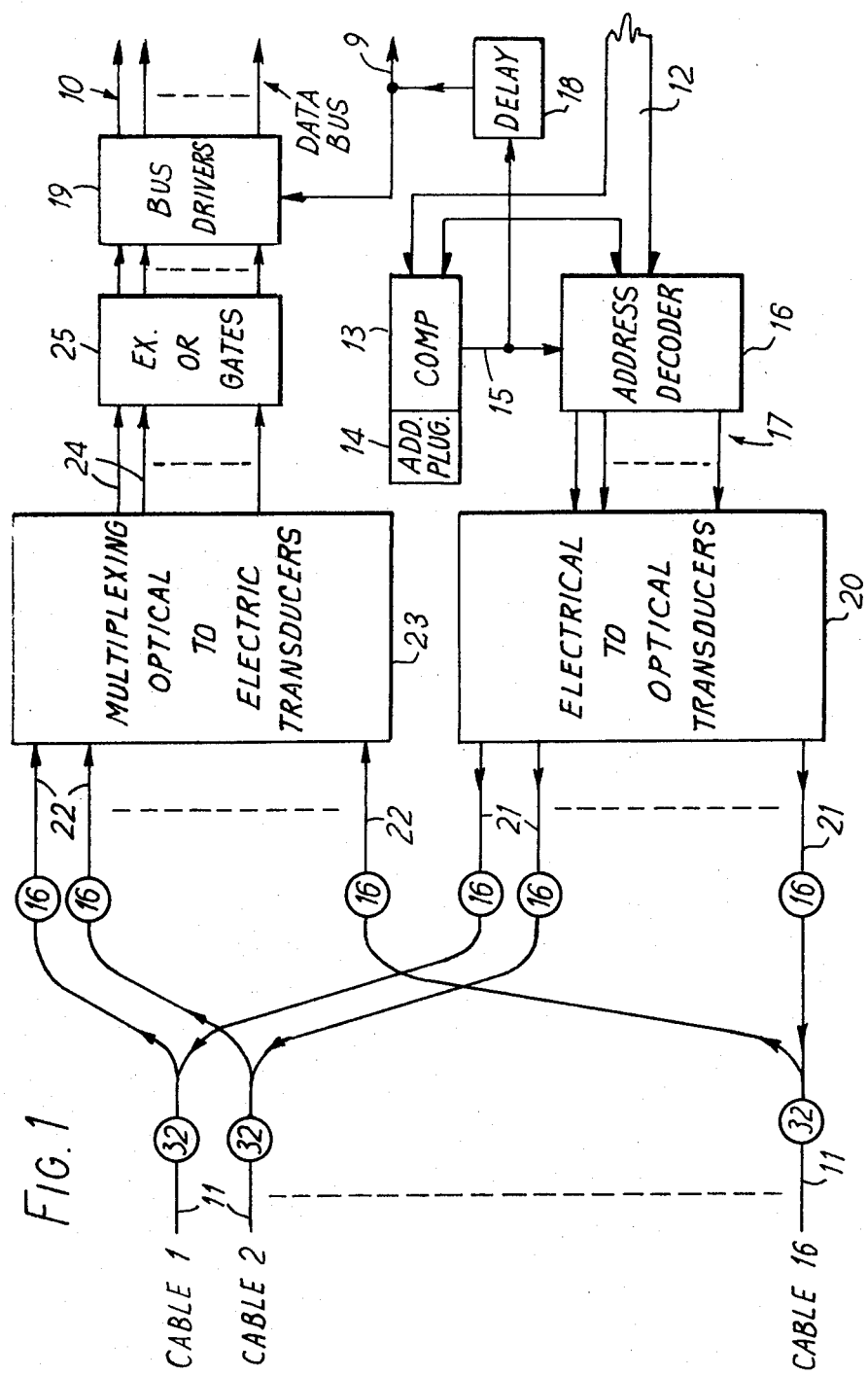
FIG. 1 is a block diagram of a complete telemetry central station.

FIG. 1 assumes a 16-bit data bus 10 serving sixteen transducer stations by way of sixteen fibre optics cables 11. Numbers in circles denote the number of fibres in a cable. A sixteen bit address bus 12 is used to address the central station and a transducer station thereof. The twelve most significant address bits address the station conventionally by way of a comparator 13 connected to an address plug 14 establishing the station address. When the station is addressed an enable signal is generated on line 15 and enables an address decoder 16 which decodes the four least significant address bits to one of sixteen address lines 17 which are in one-to-one correspondence with the cables 11. The enable signal (delayed if need be by delay 18) may be used to enable bus drivers 19 which put the data on to the bus 10 and may be sent on a control line 9 as an interrupt or other control signal.

The address lines 17 feed a bank of sixteen electrical to optical transducers 20 which launch light pulses on respective groups of sixteen first fibres 21. Each cable 11 consists of one such group and a group of sixteen second fibres 22 which return to a set of multiplexing optical to electric transducers 23. These multiplex the first bits of all second fibre groups 22 on to a second data bus line 24, the second bits of all second fibre groups 22 on to a second data bus line 24, and so on. The bus lines 24 may drive the lines of the bus 10 directly or through a transcoder illustrated as exclusive OR gates 25 employed in known manner to convert from Gray code to binary.

Figure 2:
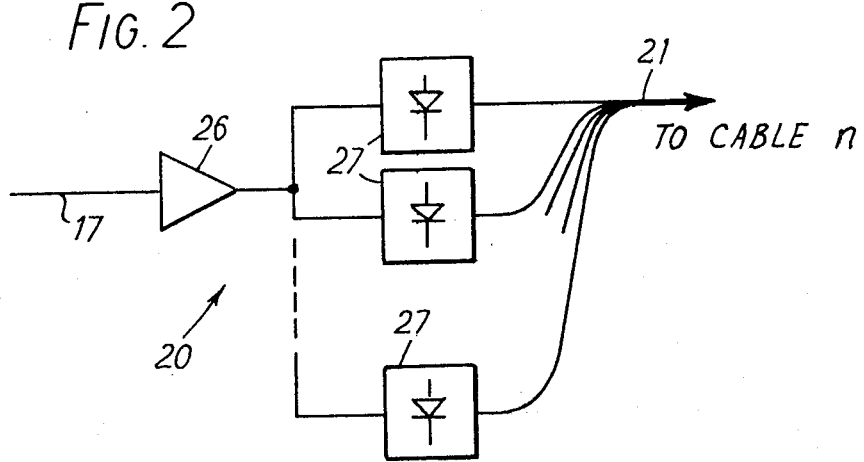
FIG. 2 illustrates an electro-optical transducer.

FIG. 2 illustrates one of the transducers 20, although any suitable electro-optical transducer arrangement can be used. The only essential in this particular embodiment is that an electrical pulse on the address wire 17 shall provide light pulses on all sixteen first fibres 21. As illustrated, a driver 26 can drive one or more LED's 27 in parallel, in which the first fibres 21 are terminated, e.g. sixteen LED's individual to the fibres respectively.

Figure 3:
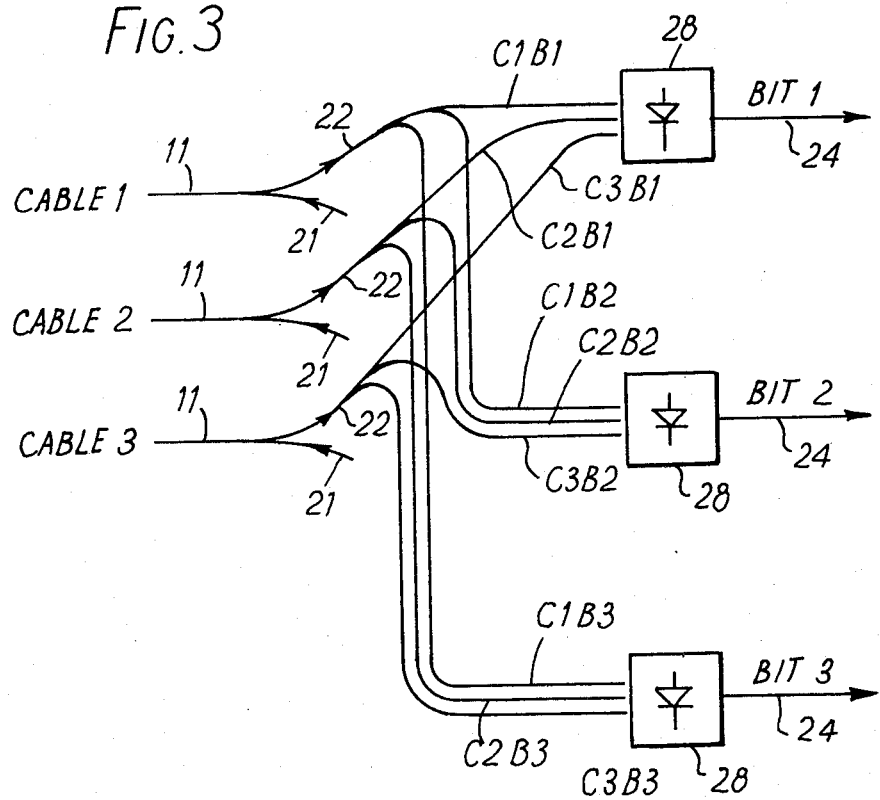
FIG. 3 illustrates an arrangement of multiplexing optical to electronic transducers.

FIG. 3 illustrates the transducers 23 but in a simplified version avoiding excessive drawing complexity. Instead of a sixteen-bit, sixteen-cable arrangement, there is shown a three-bus, three-cable arrangement. Three light-responsive diodes 28, one for each bit are connected to the three data lines 24. The second fibres 22 are identified by the codes C1, C2, C3 for cables 1, 2 and 3 and B1, B2, B3 for bits 1, 2 and 3. All the bit 1 fibres are separated from the cables and grouped to terminate opposite the bit 1 diode 28 and so on. Available diodes have large enough junctions to cater for sixteen fibres although, if needed, a plurality of diodes may be used for each bit, driving the bus lines 25 in parallel.

In operation, a pulse of light is sent on all first fibres 21 of only one cable 11, i.e. to the addressed transducer station. This station blocks some pulses (as explained below) and the non-blocked pulses return on the second fibres 22 as a sixteen bit word which is transduced on to the data bus.

It will be understood that with light-responsive devices which can also function as light-emitting devices, the light-emitting devices used for launching the pulses of light can also be used as the light-responsive transducers of FIG. 3.

Figure 4:
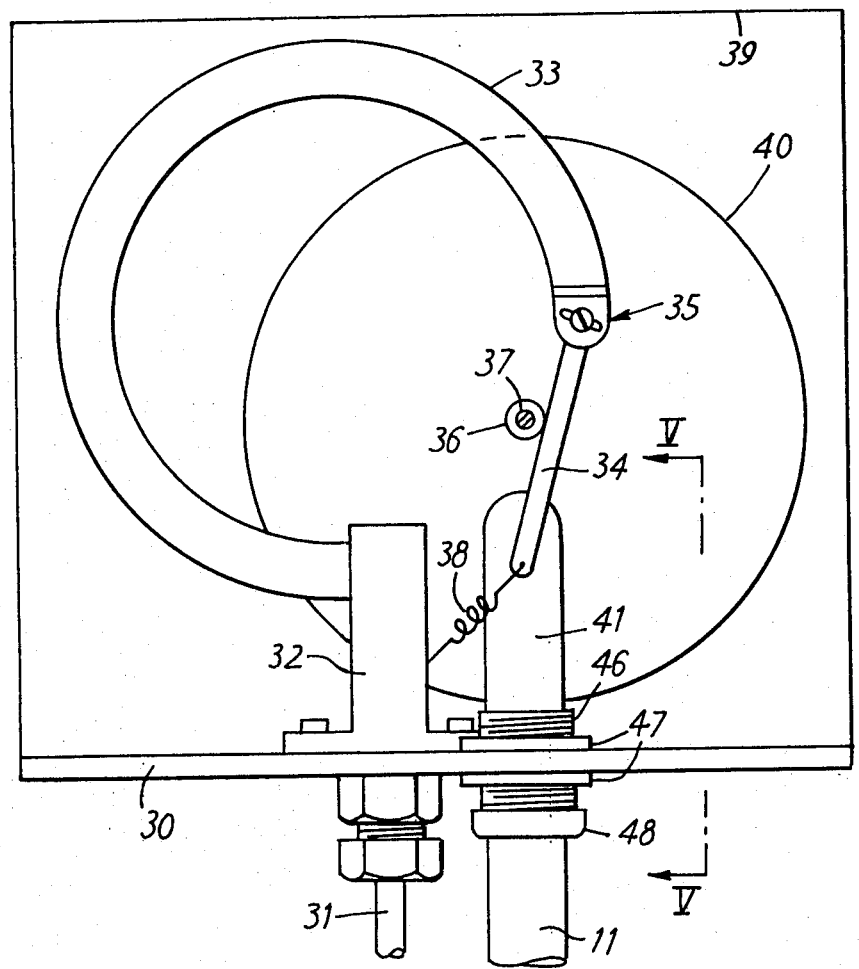
FIG. 4 illustrates a pressure gauge transducer.

FIG. 4 illustrates one instrument usable at a transducer station, namely a Bourdon-tube pressure gauge. Many other transducers (temperature, flow rate, and so on) can be designed to produce a mechanical displacement representing the transduced variable which is transduced into a digital, optical code as in the described instrument.

It is more convenient to mount the components of the gauge on a rectangular base plate 30 than upon a circular back plate as in a conventional Bourdon-tube pressure gauge. A pipe 31 is connected to a block 32 in which one end of a Bourdon tube 33 is conventionally anchored. The other end is conventionally attached to a rack 34 with a scale adjustment device 35, the rack being held against a pinion 36 on a shaft 37 by a spring 38. The shaft 37 can carry a pointer (not shown) which moves over a scale visible through a removable housing 39. As so far described the instrument is similar to a conventional gauge.

Figure 5:
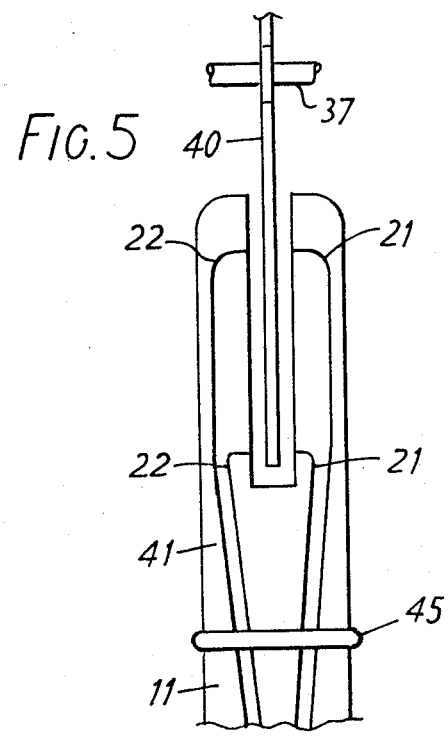
FIG. 5 shows the fibre optics cable termination at the instrument, being a view on line V—V in FIG. 4.
Figure 6:
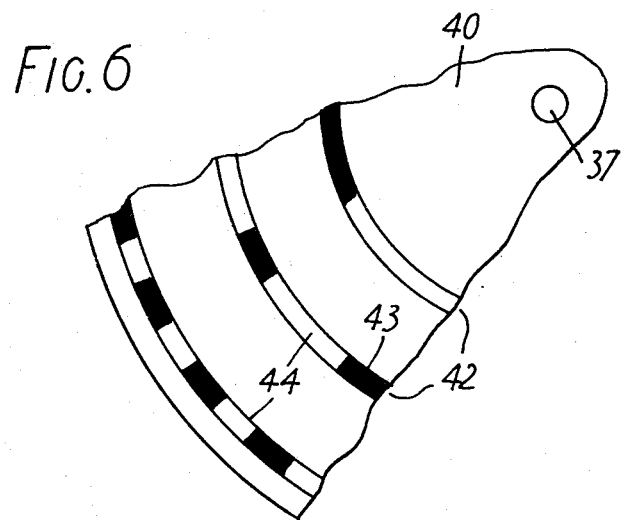
FIG. 6 is a view of a fragment of an encoding disc.

For use in the system of the invention, the shaft 37 additionally carries an encoding disk 40 which rotates in a gap in a termination 41 of the cable 11 leading to the transducer station. The principle of the encoding action is illustrated by FIGS. 5 and 6. At the termination 41, the cable 11 bifurcates (FIG. 5) so that the first fibres 21 are to one side of the disc 40 and the second fibres 22 are to the other side. The ends of the fibres are bent round to face the disc and every first fibre confronts a corresponding second fibre. The disc has a circular track between each pair of fibre ends and, as shown in FIG. 6, each track 42 consists of alternating opaque and transparent regions 43 and 44. Only three tracks are shown for simplicity. Up to sixteen tracks may be provided although normally fewer will suffice and redundant fibres are not used or are used for supplementary control bits. In the ultimate case of say a pressure switch, there will be no tracks on a disc. A simple obturating vane will move between one pair of fibre ends.

A flange 45 (FIG. 5) is moulded on to the termination 41 and enables rapid connection of the cable at the instrument. A threaded sleeve 46 is fixed through the base plate 30 by nuts 47 (FIG. 4). The termination 41 is slipped into the sleeve and a back nut 48 on the cable 11 is screwed on to the sleeve to clamp the flange 45 against the sleeve.

The disc 40 may be made in various ways including photographically, screen printing and by chemical milling of a metal disc in which the clear areas 44 being milled through. Over the sector of the disc corresponding to full scale gauge deflection, for binary coding, the inmost track will consist of one opaque and one clear area, the next track of two opaque and two clear areas, and so on. For n bit resolution, the outermost track has n transitions between opaque and clear areas. These may become very close (circumferentially) if n is at all large. Also binary code involves a change of all or nearly all bit values at some transitions (e.g. 0111 to 1000 to give a four-bit example) which is difficult to read in practice. For these reasons it is preferred to use a Gray code in which a transition between any two consecutive numbers in a sequence is indicated by a change in a single bit. Even so, the outermost track has n/2 transitions. This may be reduced to n/4 transitions by using a modified Gray code in which two tracks are used to indicate the least significant Gray bit in accordance with the following table in which 1 and 0 represent transparent and opaque areas respectively, $T_0$ to $T_4$ represent five tracks numbering radially inwardly, $L_1$ to $L_4$ represent corresponding Gray code bits and $B_1$ to $B_4$ represent corresponding binary code bits. The extension to larger numbers of bits is obvious.

TABLE

| $T_4$ | $T_3$ | $T_2$ | $T_1$ | $T_0$ | $L_4$ | $L_3$ | $L_2$ | $L_1$ | $B_4$ | $B_3$ | $B_2$ | $B_1$ | Decimal |
|---|---|---|---|---|---|---|---|---|---|---|---|---|---|
| 0 | 0 | 0 | 0 | 0 | 0 | 0 | 0 | 0 | 0 | 0 | 0 | 0 | 0 |
| 0 | 0 | 0 | 0 | 1 | 0 | 0 | 0 | 1 | 0 | 0 | 0 | 1 | 1 |
| 0 | 0 | 1 | 0 | 1 | 0 | 0 | 1 | 1 | 0 | 0 | 1 | 0 | 2 |
| 0 | 0 | 1 | 1 | 1 | 0 | 0 | 1 | 0 | 0 | 0 | 1 | 1 | 3 |
| 0 | 1 | 1 | 1 | 1 | 0 | 1 | 1 | 0 | 0 | 1 | 0 | 0 | 4 |
| 0 | 1 | 1 | 1 | 0 | 0 | 1 | 1 | 1 | 0 | 1 | 0 | 1 | 5 |
| 0 | 1 | 0 | 1 | 0 | 0 | 1 | 0 | 1 | 0 | 1 | 1 | 0 | 6 |
| 0 | 1 | 0 | 0 | 0 | 0 | 1 | 0 | 0 | 0 | 1 | 1 | 1 | 7 |
| 1 | 1 | 0 | 0 | 0 | 1 | 1 | 0 | 0 | 1 | 0 | 0 | 0 | 8 |
| 1 | 1 | 0 | 0 | 1 | 1 | 1 | 0 | 1 | 1 | 0 | 0 | 1 | 9 |
| 1 | 1 | 1 | 0 | 1 | 1 | 1 | 1 | 1 | 1 | 0 | 1 | 0 | 10 |
| 1 | 1 | 1 | 1 | 1 | 1 | 1 | 1 | 0 | 1 | 0 | 1 | 1 | 11 |
| 1 | 0 | 1 | 1 | 1 | 0 | 1 | 0 | 1 | 1 | 0 | 0 | 12 |
| ETC | | | | | ETC | | | | ETC | | | | ETC |

It will be seen that $B_1$ alternates 0 1 0 1 . . . whereas $L_1$ only alternates 0 0 1 1 0 0 1 1 . . . etc. $T_0$ to $T_1$ however only alternate 0 0 0 0 1 1 1 1 0 0 0 0 1 1 1 1 . . . $L_1$ is readily formed as the enclusive OR of $T_0$ and $T_1$. This scheme requires one more track than there are data bits but if as many as sixteen cracks are available, this is unlikely to create any problem. For many purposes thirteen tracks yielding twelve-bit resolution will be more than adequate.

The system described will appear to the central control processor as part of its memory so that the task of retrieving system data is reduced to the simple action of fetching data from a memory location. This action is facilitated by the use of the optical instruments and associated data collection equipment as described, because system data is immediately available in digital form. However, the speed of data retrieval is dependent upon the communication system used, if the processor is remote. The new optical equipment could be incorporated in hybrid optical/electrical telemetry systems where the optical data would be interfaced to existing communication equipment, utilizing the electrical buses 10 and 12 and serial data transmission. As a refinement, the use of communication multiplexing will provide parallel address and data bus facilities to increase the effective data rate very substantially.

In the longer term, the introduction by the Post Office of an optical communication network should eliminate the need for conventional communication equipment in telemetry systems and will make possible data rates of the order of megabauds.

For process control applications, where communication over long distances is not necessary, the optical solution could be implemented immediately. In these applications the optical equipment could be interfaced directly to the processor thus obviating the need for conventional outstation equipment.

Instead of opaque and transmitting areas, the disc may employ non-reflecting and reflecting areas, light passing from first fibres to second fibres by reflection.

I claim:

1. A telemetry system comprising a plurality of transducer stations connected to a central station by respective fibre optics cables, each comprising at least one first fibre and a plurality of second fibres, each transducer station being selectively and separately activated by its respective fibre optics cable and including selective light transfer means responsive to the transduced quantity to cause light to pass from said at least one first fibre to a combination of the second fibres corresponding to the transduced quantity, the central station comprising launching means adapted to launch light pulses in said at least one first fibre of any one selected cable, and multiplexing means connected to the fibre optics cables of all of said transducer stations and responsive to light pulses returning along the second fibres thereof to multiplex data pertaining to the various transducer stations.

2. A telemetry system according to claim 1, wherein each cable includes N first fibres and N second fibres, the launching means launch light pulses down all N first fibres of any one selected cable, and the second fibres are multiplexed into an N-bit data bus, where N is an integer greater than 1.

3. A telemetry system according to claim 1, wherein the data bus comprises a plurality of electrical conductors and the multiplexing means comprise in respect of each such conductor at least one optoelectronic transducer terminating all corresponding second fibres from the cables and connected to the respective conductor.

4. A telemetry system according to claim 1, comprising an address bus connected to an address decoder having output lines individual to the cables, each output line being connected to at least one electro-optic transducer which drives all first fibres of the corresponding cable.

5. A telemetry system according to claim 1, wherein the transfer means at each transducer station includes an encoding disk having a plurality of tracks of light transfer areas and non light transfer areas interposed between the ends of the first and second fibres.

6. A telemetry system according to claim 5, wherein the three outermost tracks have their areas arranged to represent the following pattern of bit values cyclically:
0 0 0
0 0 0
0 0 1
1 0 1
1 1 1
1 1 1
1 1 0
0 1 0.

7. A telemetry system according to claim 2, wherein the means for launching light down all N first fibres in the plurality of cables comprise electro-optic transducers, and the multiplexing means comprise the same transducers operating in reverse as opto-electronic transducers.

* * * * *